(12) United States Patent
Duranleau-Hendrickx et al.

(10) Patent No.: US 12,140,087 B1
(45) Date of Patent: Nov. 12, 2024

(54) TIME VARYING RESLAM LOGIC FOR ACCELERATION REFERENCE AND MAXIMUM FUEL FLOW RATE

(71) Applicant: Pratt & Whitney Canada Corp., Longueuil (CA)

(72) Inventors: Louis Duranleau-Hendrickx, Montreal (CA); George Thompson, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/343,927

(22) Filed: Jun. 29, 2023

(51) Int. Cl.
*F02C 9/28* (2006.01)

(52) U.S. Cl.
CPC ............ *F02C 9/28* (2013.01); *F05D 2270/04* (2013.01)

(58) Field of Classification Search
None
See application file for complete search history.

(56) References Cited

U.S. PATENT DOCUMENTS

| 3,772,882 A | 11/1973 | Warne |
| 4,432,201 A | 2/1984 | Hawes |
| 4,442,667 A | 4/1984 | MacIsaac |

FOREIGN PATENT DOCUMENTS

EP  3351771 B1  3/2021

*Primary Examiner* — Katheryn A Malatek
(74) *Attorney, Agent, or Firm* — Carlson, Gaskey & Olds, P.C.

(57) ABSTRACT

A method of controlling an aircraft engine with an engine control system for limiting acceleration in response to reslam operation. The method includes triggering a reslam logic, detecting an acceleration that exceeds an acceleration threshold, and determining an elapsed time debit based on time elapsed from triggering of the reslam logic threshold. The elapsed time debit is inversely proportional to the elapsed time from triggering of the reslam logic and is utilized to set an engine acceleration reference value limit and maximum fuel rate limit.

15 Claims, 9 Drawing Sheets

TIME VARYING RESLAM LOGIC FOR ACCELERATION REFERENCE AND MAXIMUM FUEL FLOW RATE

TECHNICAL FIELD

The present disclosure relates generally to a turbine engine control system for limiting engine response during specified engine operating conditions. More specifically, this disclosure is directed to an engine control system that limits engine response after a rapid deceleration.

BACKGROUND

Turbine engines are controlled to operate within limits to prevent stalls or surges during operation. Limits to engine operation are dependent of many different factors and operating conditions. One such condition is referred to as "reslam" operation. Reslam operation occurs when an engine has operated at a steady state high power level for an extended period, decelerated sharply followed by a sharp acceleration. During steady state operation, temperatures have typically stabilized and are operating at desired efficiencies. Rapid deceleration from the steady state operation then back to a high power setting requiring a rapid acceleration is not desirable. The reslam operation may render the engine susceptible to stall and surge conditions caused by transient heat transfer, thermal equilibrium and lagging engine variable geometries. For this reason, a debit is implemented upon recognition of reslam operation to limit subsequent accelerations. However, such debits may impede operation beyond that needed to stabilize engine operation.

Turbine engine manufacturers continue to seek further improvements to engine performance including improvements to thermal, transfer and propulsive efficiencies.

SUMMARY

A method of controlling an aircraft engine with an engine control system for limiting acceleration in response to reslam operation, the method according to an exemplary embodiment of this disclosure, among other possible things includes triggering a reslam logic threshold, detecting an acceleration that exceeds an acceleration threshold, determining an elapsed time debit based on time elapsed from triggering of the reslam logic threshold, the elapsed time debit is inversely proportional to the elapsed time from triggering of the reslam logic threshold, determining a debit based at least partially on the elapsed time debit, setting an engine acceleration reference value limit and maximum fuel rate limit based on the debit, and operating the engine within the set acceleration value limit and the fuel rate limit.

A control system for an aircraft engine according to another exemplary embodiment of this disclosure, among other possible things includes a controller that includes a processor and a memory for setting acceleration limits of an engine during reslam operation, the controller is programmed to trigger operation of a reslam logic threshold, to detect an acceleration that exceeds an acceleration threshold, to determine an elapsed time debit based on time elapsed from triggering of the reslam logic threshold, the elapsed time debit is inversely proportional to the elapsed time from triggering of the reslam logic threshold, to determine a debit based at least partially on the elapsed time debit, setting an engine acceleration reference value limit and maximum fuel rate limit based on the debit, to operate the engine within the set acceleration value limit and the fuel rate limit, and to return limits to the acceleration reference value and the fuel rate to a non-debited limit after the predefined duration.

An aircraft engine assembly according to another exemplary embodiment of this disclosure, among other possible things includes a core engine that includes a compressor section where an inlet airflow is compressed, a combustor section where the compressed inlet airflow is mixed with fuel and ignited to generate an exhaust gas flow that is communicated through a core flow path and a turbine section where expansion of the exhaust gas flow is utilized to generate a mechanical power output. An engine control system includes a controller that has a processor and a memory that includes instruction that is executed by the processor for setting acceleration limits of the core engine during reslam operation. The controller is programmed to trigger operation of a reslam logic threshold, to detect an acceleration that exceeds an acceleration threshold, to determine an elapsed time debit based on time elapsed from triggering of the reslam logic threshold, the elapsed time debit is inversely proportional to the elapsed time from triggering of the reslam logic threshold, to determine a constant debit based at least partially on the elapsed time debit, setting an engine acceleration reference value limit and maximum fuel rate limit based on the constant debit, to operate the engine within the set acceleration value limit and the fuel rate limit, and to return limits to the acceleration reference value and the fuel rate to a non-debited limit after the predefined duration.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
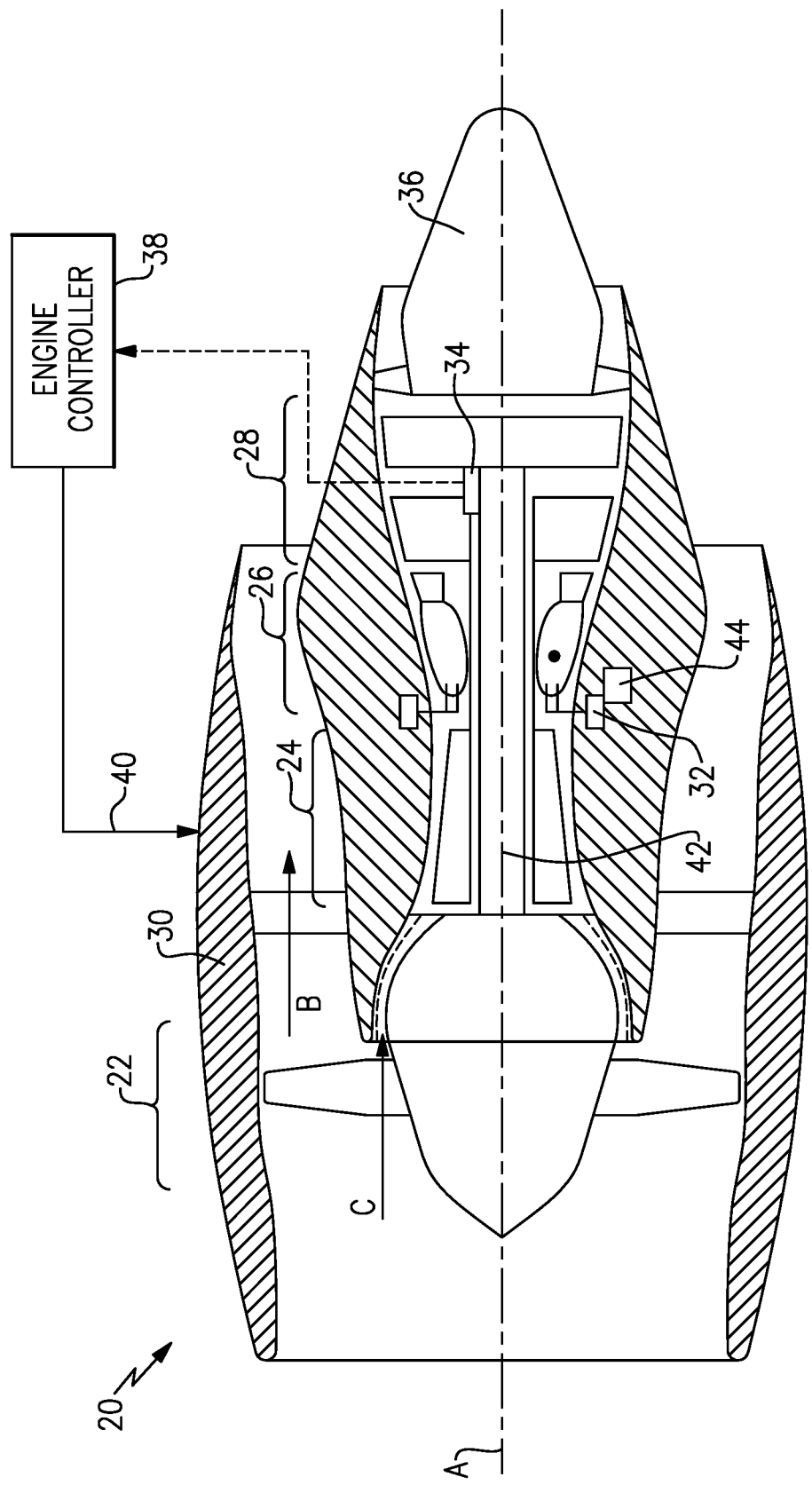
FIG. 1 is a schematic view of an example gas turbine engine.

FIG. 1 schematically illustrates a gas turbine engine 20 with an engine controller 38 having a reslam logic that debits both an acceleration reference and a maximum fuel flow rate change as a function of an elapsed time from detection of a deceleration condition. The debit applied to acceleration reference and the maximum fuel flow rate of change is inversely proportional to the duration of time elapsed. Moreover, the debit may also be varied based on a magnitude of the detected deceleration that triggered the reslam logic.

The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The compressor section 24 drives air along a core flow path C into the compressor section 24 for compression and communication into the combustor section 26. In the combustor section 26, the compressed air is mixed with fuel from a fuel system 32 and burnt to generate an exhaust gas flow that expands through the turbine section 28 and is exhausted through exhaust nozzle 36. A sensor 34 provides information indicative of a speed of at least one of the engine shafts 42. Moreover, a flow rate sensor 44 communicates information indicative of a fuel flow rate to the engine controller 38. The engine controller 38 generates signals 40 that control operation of the engine 20.

Although depicted as a turbofan turbine engine in the disclosed non-limiting embodiment, it should be understood that the concepts described herein are not limited to use with turbofans as the teachings may be applied to other turbine engine architectures.

Figure 2:
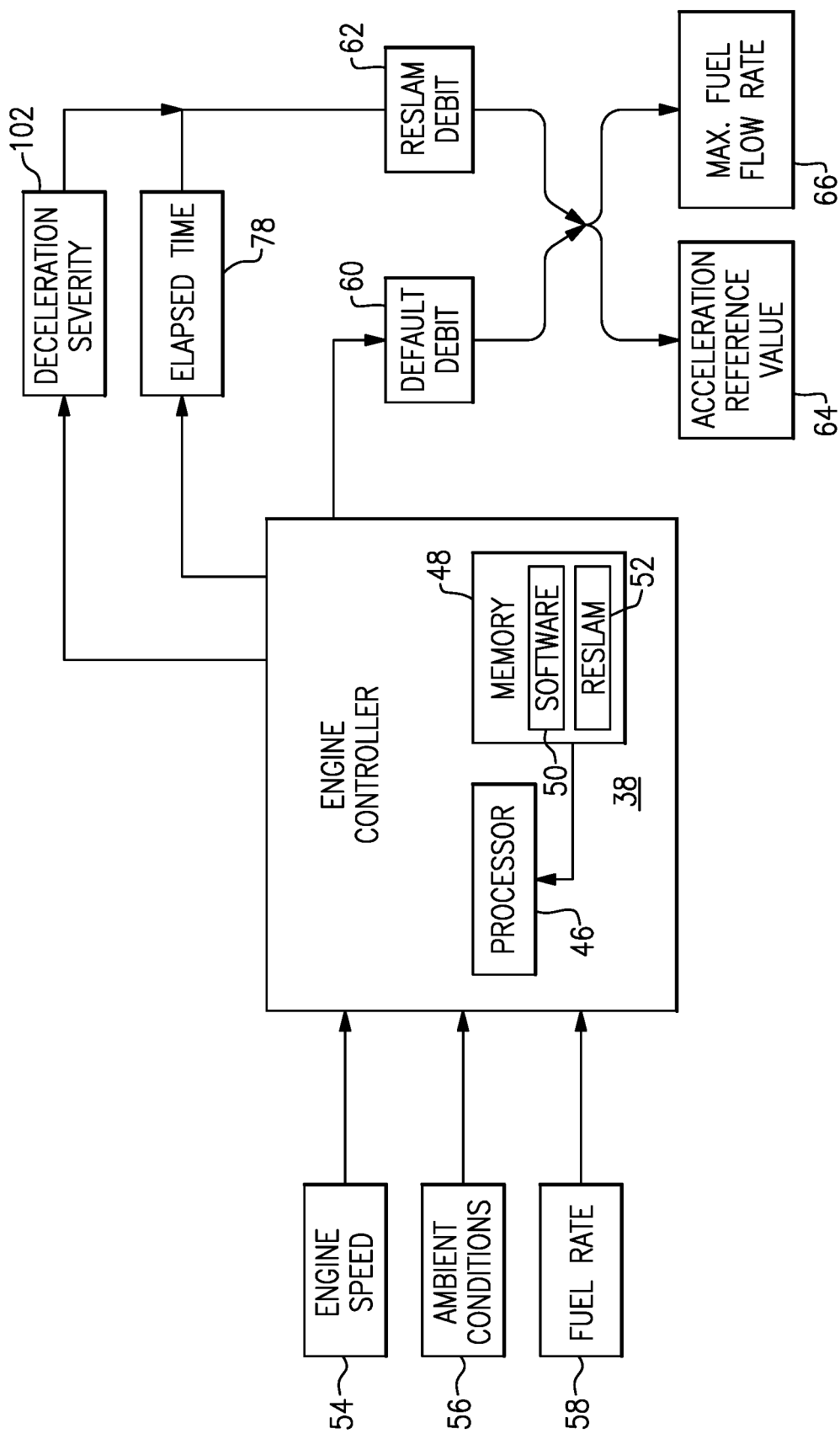
FIG. 2 is a schematic view of an example engine control system for limiting acceleration after reslam operation.

Referring to FIG. 2, with continued reference to FIG. 1, the engine controller 38 includes a processor 46 and a memory device 48. The example controller 38 relates to a device and system for performing necessary computing or calculation operations. The controller 38 may be specially constructed or it may comprise at least a general-purpose computer selectively activated or reconfigured by software instructions 50 stored in the memory device 48. The memory device 48 further includes a reslam logic 52 that includes instructions that are performed by the processor 46 for determining a debit to engine operation in response to detection of a reslam operation. The controller 38 may further be part of full authority digital engine control (FADEC) or an electronic engine controller (EEC).

The disclosed memory device 48, may include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 50 in the memory device 48 may include one or more separate programs, each of which includes an ordered listing of executable instructions for implementing logical functions. Software in memory, in whole or in part, is read by the processor 46, and executed to generate debit limits. The example engine controller 38 includes all devices that operate to communicate with the engine assembly 20 to generate the thrust based on debits determined by the processor 46 utilizing the example reslam logic 52.

The engine controller 38 receives information relating to engine speed 54, ambient conditions 56 and fuel flow rate 58, among other information. The engine controller 38 determines the default debit 60 and/or a reslam debit 62 that is applied to an acceleration reference value 64 and a maximum fuel flow rate 66. The applied debit places a limit on each of the acceleration reference value 64 and the maximum fuel flow rate 66 to limit engine operation. The example acceleration reference value 64 may be speed of an engine shaft 2 as provided by a speed sensor 34, or other measured engine speeds that are indicative of engine operation. The maximum fuel flow rate 66 is based on an output command to control actuation of the fuel system 32 to limit fuel flow and is not typically measured. However, it is within the contemplation of this disclosure that the flow rate 66 may be measured by the flow sensor 44.

Figure 3:
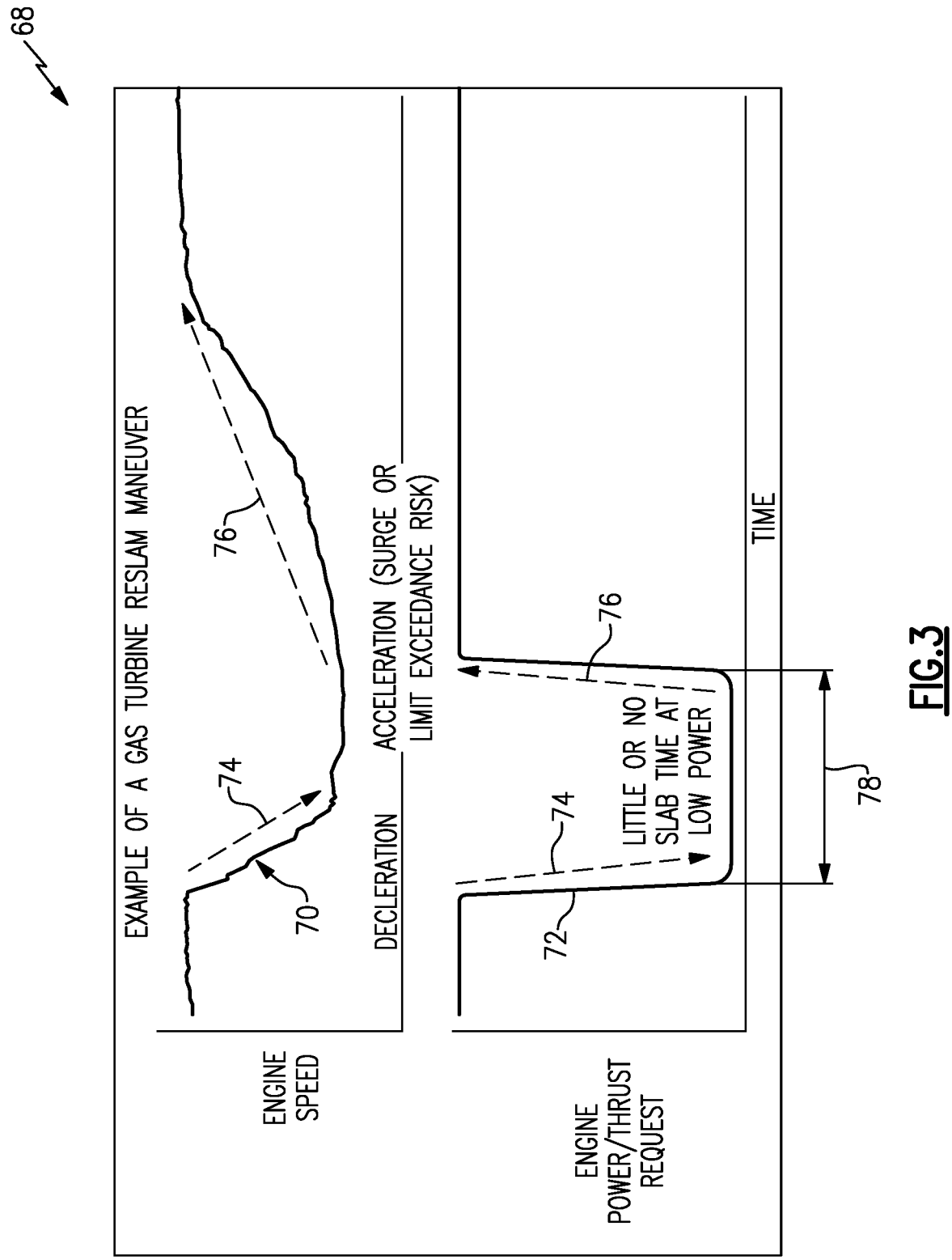
FIG. 3 is a graph illustrating an example engine reslam operation.

Referring to FIG. 3, with continued reference to FIG. 2, the reslam logic 52 is necessary on gas turbine engines that are susceptible to stalls/surges during a rapid increase in power/thrust request following a rapid decrease in power/thrust request with little or no stabilization time. A reslam operation is a sharp deceleration 74 of engine speed 70, and therefore engine power 72 followed after a short elapsed time 78 by a rapid acceleration demand 76. Engines are not re-slammed at the same acceleration rate as may be conducted during normal engine rapid accelerations because of the impact of transient heat transfer, lagging engine variable geometries and stabilizing clearances in the turbomachinery that are susceptible to thermal changes.

The different phases of an example reslam operation are shown in the graph 68 shown in FIG. 3. Engine surges and exceedances are caused by the nominal engine core acceleration reference value 64 being too high for the reslam condition. The example reslam logic 52 temporarily debits, or limits, the acceleration reference value 64 and the maximum fuel flow rate 66 once a deceleration 74 condition is detected to prevent the engine from surging/exceeding limit on the subsequent acceleration.

The example a reslam logic 52 debits both the Acceleration reference value 64 and the maximum fuel flow rate of change 66. The example reslam logic 52 modulates the magnitude of the reslam debit 62 based an elapsed time 78 from the moment when the deceleration condition is detected and the reslam logic is activated. The reslam debit 62 is inversely proportional to the elapsed time from the triggering of the reslam logic 52. In other words, the shorter the elapsed time between the deceleration and a subsequent acceleration demand, the larger the reslam debit 62. Moreover, the longer the elapsed time between the initial deceleration, the smaller the reslam debit 62.

The reslam debit 62 is also modulated based on a magnitude of the deceleration that triggered the reslam logic 52. For example, a more aggressive deceleration would incur a larger debit as compared to a less aggressive deceleration. The magnitude of the deceleration is determined as a deceleration severity debit 102. In one example embodiment, the deceleration severity debit 102 is based on a ratio between the maximum detected deceleration and a nominal deceleration reference. The nominal deceleration reference may be predefined in a look-up table for current engine operating conditions.

Figure 4:
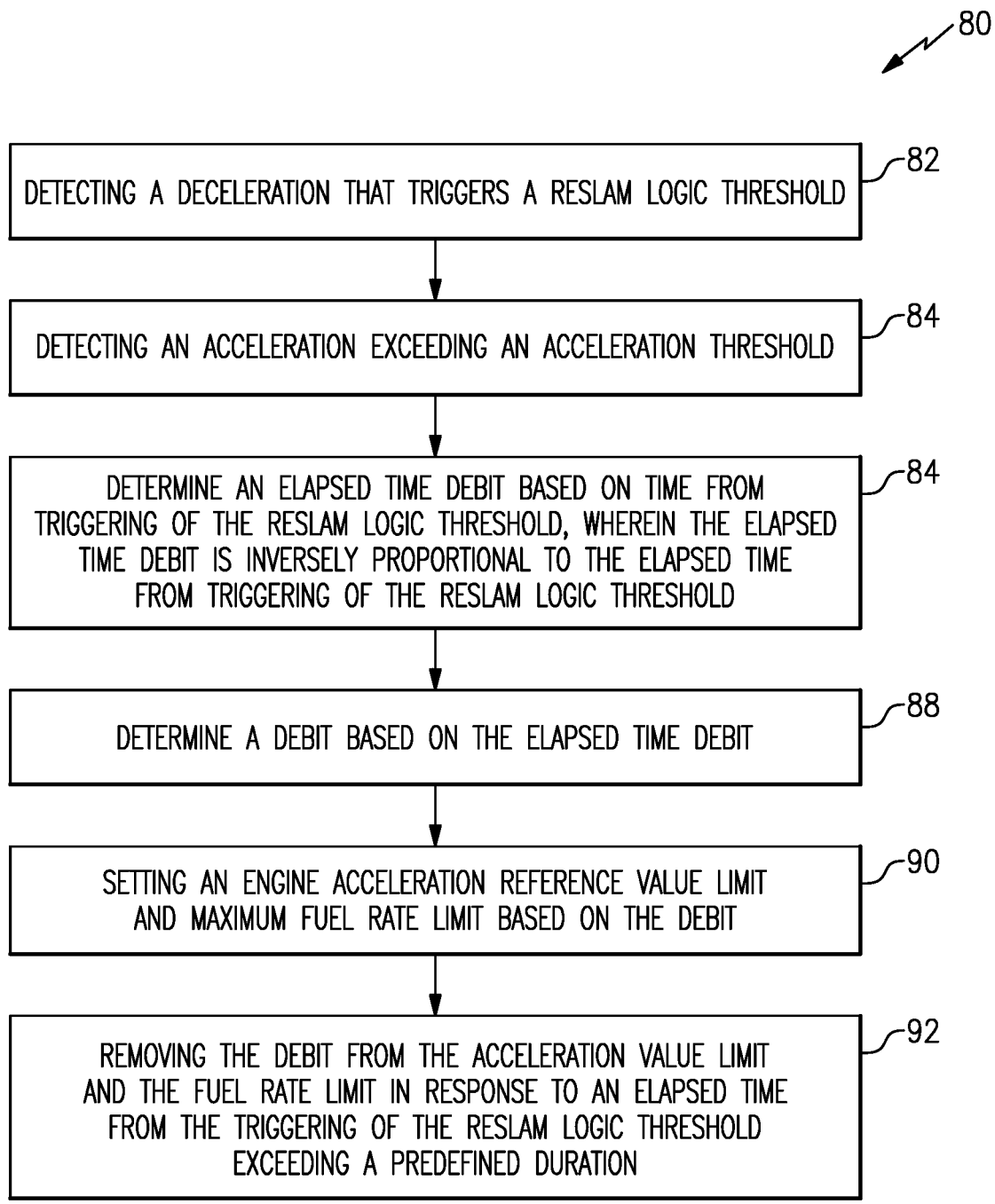
FIG. 4 is a flow diagram illustrating method steps of an example reslam engine control embodiment.
Figure 5:
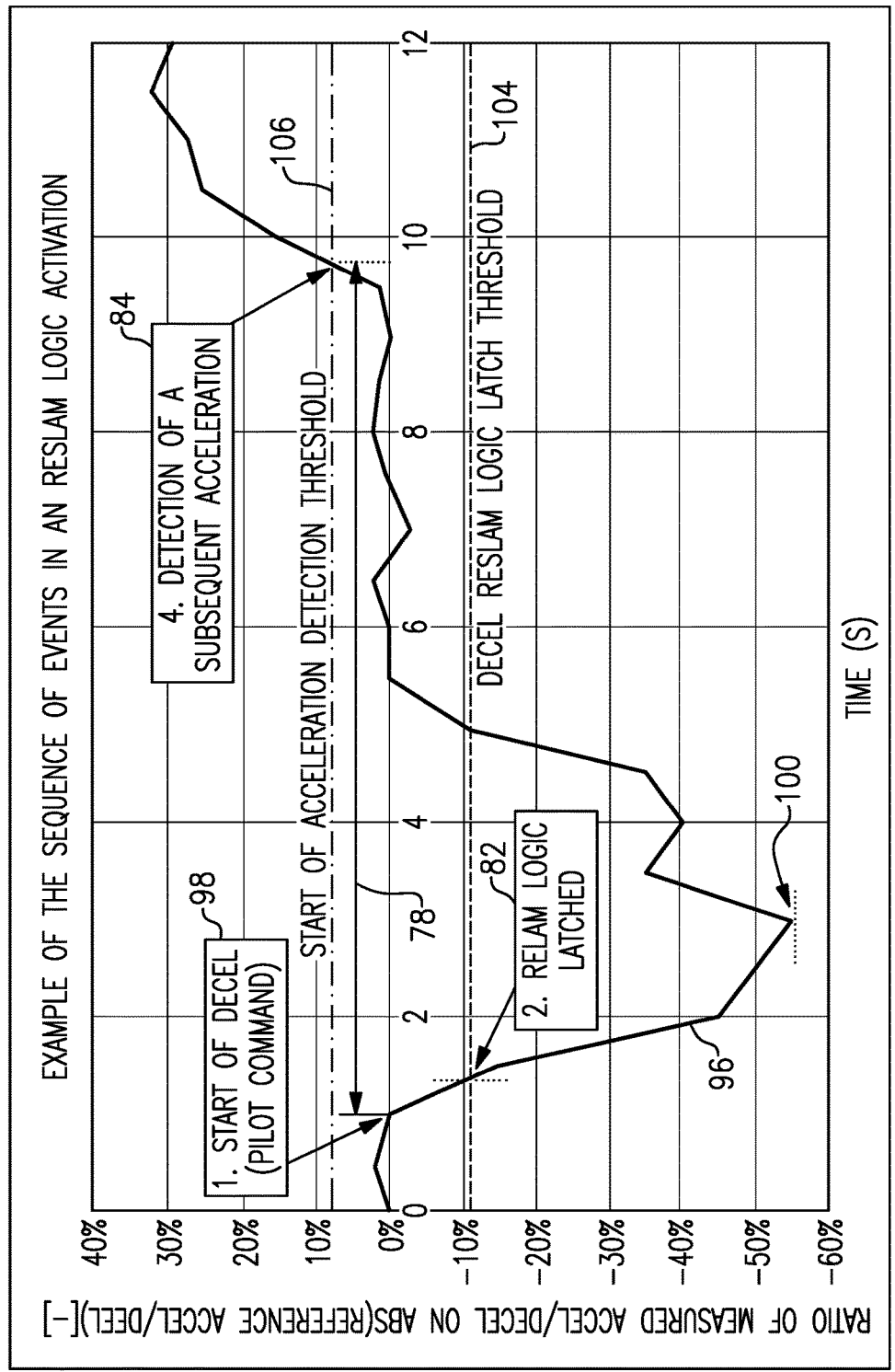
FIG. 5 is a graph illustrating operation of an engine during reslam operation.

Referring to FIGS. 4 and 5 with continued reference to FIG. 2, steps of an example reslam logic 52 embodiment is shown in a flow chart 80 in FIG. 4 and graph 94 in FIG. 5. An engine acceleration 96 is shown as a ratio of measured acceleration and measured deceleration relative to their respective reference values over time. The reslam logic 52 is triggered after an initial deceleration prompted by a pilot as shown at 98. Once the deceleration continues past a reslam logic trigger threshold 104 (FIG. 5), the reslam logic 52 is triggered as a deceleration exceeding the threshold 104 and a timer started.

The deceleration that prompts the reslam logic may be detected in other ways and remain within the contemplation and scope of this disclosure. For example, deceleration that prompts the reslam logic may also be based on various engine and ambient conditions. For example, a deceleration lower than a defined percent of a measured speed could be used to trigger the reslam logic to debit engine performance.

The deceleration continues to a maximum point as indicated at 100. At the point 100, a severity of the deceleration is determined. In one disclosed example, the severity of the deceleration is quantified as the deceleration severity debit 102.

Once an acceleration is detected as indicated at 84 in the flow chart 80, the elapsed time 78 is determined. In one example embodiment, acceleration is detected based on passing an acceleration threshold 106 shown in graph 94. The elapsed time is the time between triggering of the reslam logic based on the deceleration indicated at 98 and detection of the acceleration past the threshold as indicated at 84. The elapsed time is utilized to determine an elapsed time debit as indicated at 86. Additionally, ambient conditions are considered along with the elapsed time to determine an elapsed time debit value. In one example embodiment, the longer the elapsed time, the lower the debit. The ambient conditions are considered and modify the elapsed time debit value based on predefined conditions including ambient temperatures. The more extreme the ambient conditions, the greater the debit.

The deceleration severity debit 102 modifies the elapsed time debit indicated at 86 to provide a final debit indicted at 88. The deceleration severity debit 102 modifies the final debit to factor in extreme engine operation. Higher severity will lengthen the final engine acceleration response time. The deceleration severity debit evaluation is not limited to a ratio (of the deceleration on the deceleration reference, but could also be function of the minimum or the average measured past deceleration. That relationship could vary based on various engine and ambient conditions.

Once the final debit is determined as indicated at 88 in FIG. 4, the acceleration reference value 64 and the maximum fuel rate value 66 will be debited to set limits on engine acceleration as indicated at 90. The engine 20 is then operated within the reduced limits for a predefined time period. The predefined time period is determined as that duration needed for the engine to regain thermal equilibrium that allows for operation under the default debits. The default debits are based on common engine operation, such as for example ambient conditions. Once the predefined time period expires, the reslam debits are removed and the default debits applied to the acceleration reference value and the maximum fuel flow rate as indicated at 92.

Figure 6:
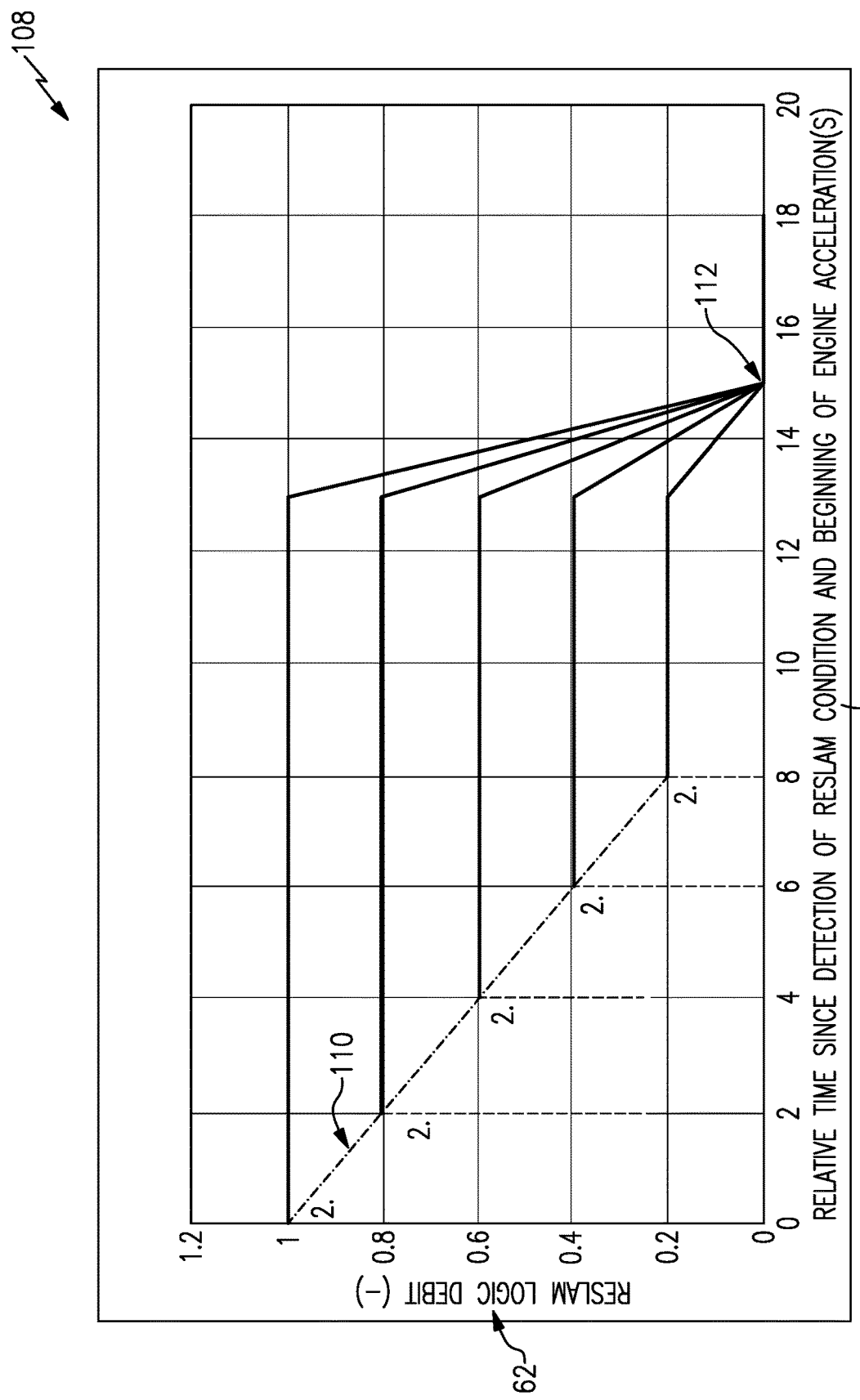
FIG. 6 is a graph illustrating different time and rates for removing acceleration debits after implementation of reslam limits.

Referring to FIG. 6, graph 108 illustrates the inversely proportional relationship between the reslam debit 62 and the elapsed time 78. The debit 62 decreases as the elapsed time 78 increases as shown by line 110. Although the line 110 is shown by way of example as a linear trend, the rate that the debit is increased or decreased relative to the elapsed time 78 may vary non-linearly. Moreover, the shape and magnitude of the debit 62 may vary based on ambient conditions such as, for example, altitude, temperature, aircraft speed and/or, engine speed/power.

In the disclosed example shown in graph 108, the end of the reslam debit indicated at 112 is shown at a fixed elapsed time and the reslam debit 62 is shown as being constant for the entire elapsed time 78.

Figure 7:
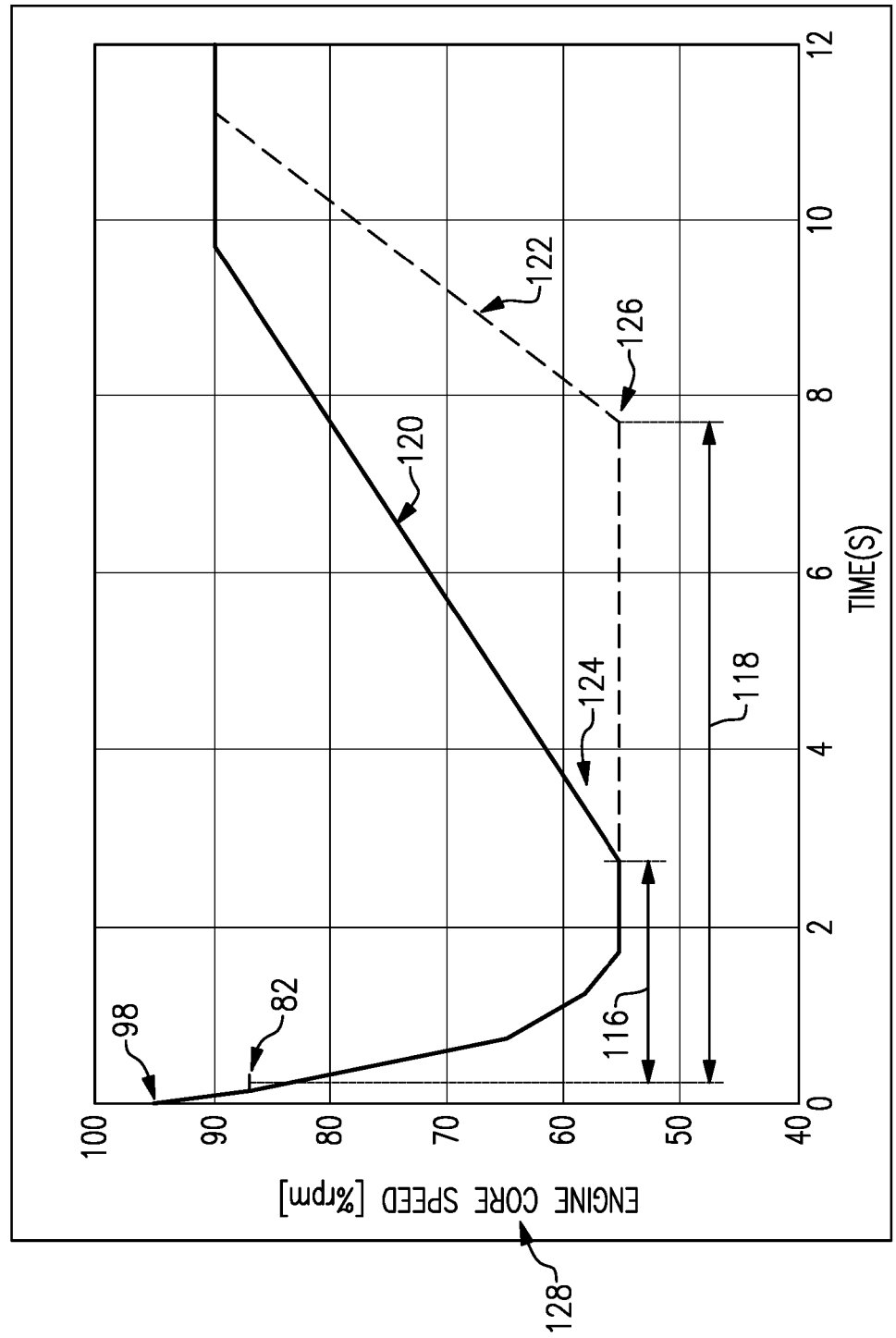
FIG. 7 is a graph illustrating different reslam debits for different elapsed times.

Referring to FIG. 7, graph 114 shows an example of how the reslam debit 62 is modulated based on the elapsed time 78 from triggering of the logic as indicated at 82 and a subsequent acceleration. The graph 114 shows the core speed 128 over time 78. The start of the initial deceleration indicated at 98 and triggering of the reslam logic indicated at 82 are the same. In a first example, the elapsed time 116 is relatively short between trigger of the reslam logic 82 and subsequent acceleration indicated at 124. The subsequent acceleration from the point 124 is indicated at 120. In a second example, subsequent acceleration indicated at 122 does not occur for a longer elapsed time indicated at 118. In the second example, acceleration does not begin until the point 126. Accordingly, the acceleration indicated by 122 is not as limited as compared to the acceleration indicated by line 120. The second acceleration 122 re-accelerates sooner after the reslam debit than the first acceleration 120.

Figure 8:
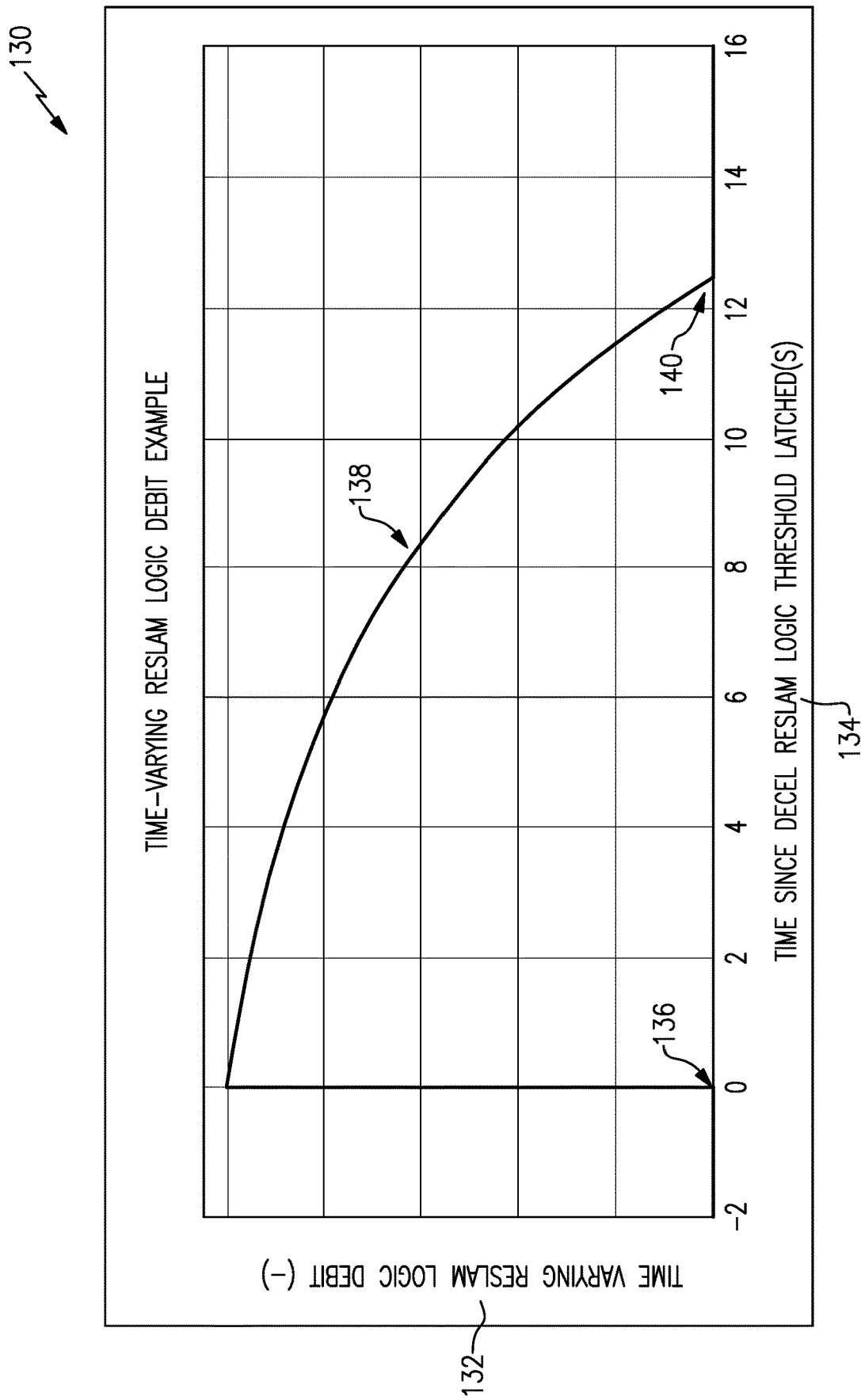
FIG. 8 is a graph illustrating a time-varying reslam debits.

Referring to FIG. 8, in another example embodiment illustrated by graph 130, a reslam debit 132 over time 134 that is determined for each of a plurality of intervals within the elapsed time 134. Instead of maintaining a fixed reslam debit as is shown in FIG. 6, the example debit 138 varies from the reslam logic trigger indicated at 136 and a time when the debit 138 is zero as indicated at 140. The intervals are of a predefined duration and provide for varying reslam debit that decreases over time. Furthermore, the intervals may, for example, be set to correspond with a loop refresh loop rate at the controller 38, EEC or the FADEC.

Accordingly, in this example embodiment, for each interval, a reslam debit is determined using a predefined relationship that decreases the debit with elapsed time. The decreasing reslam debit could be implemented by a table or an equation. At each interval, the reslam debit is modified in view of the deceleration severity debit to obtain a final debit for that time interval. For example, this could be done by multiplying both debits together. The final debit is used to reduce the engine acceleration reference and the maximum fuel flow rate for that time interval. The process is repeated for each time interval until the final debit is zero as shown at 140. The variable reslam debit 138 shown in FIG. 8 is one example of how the reslam debit may vary.

Figure 9:
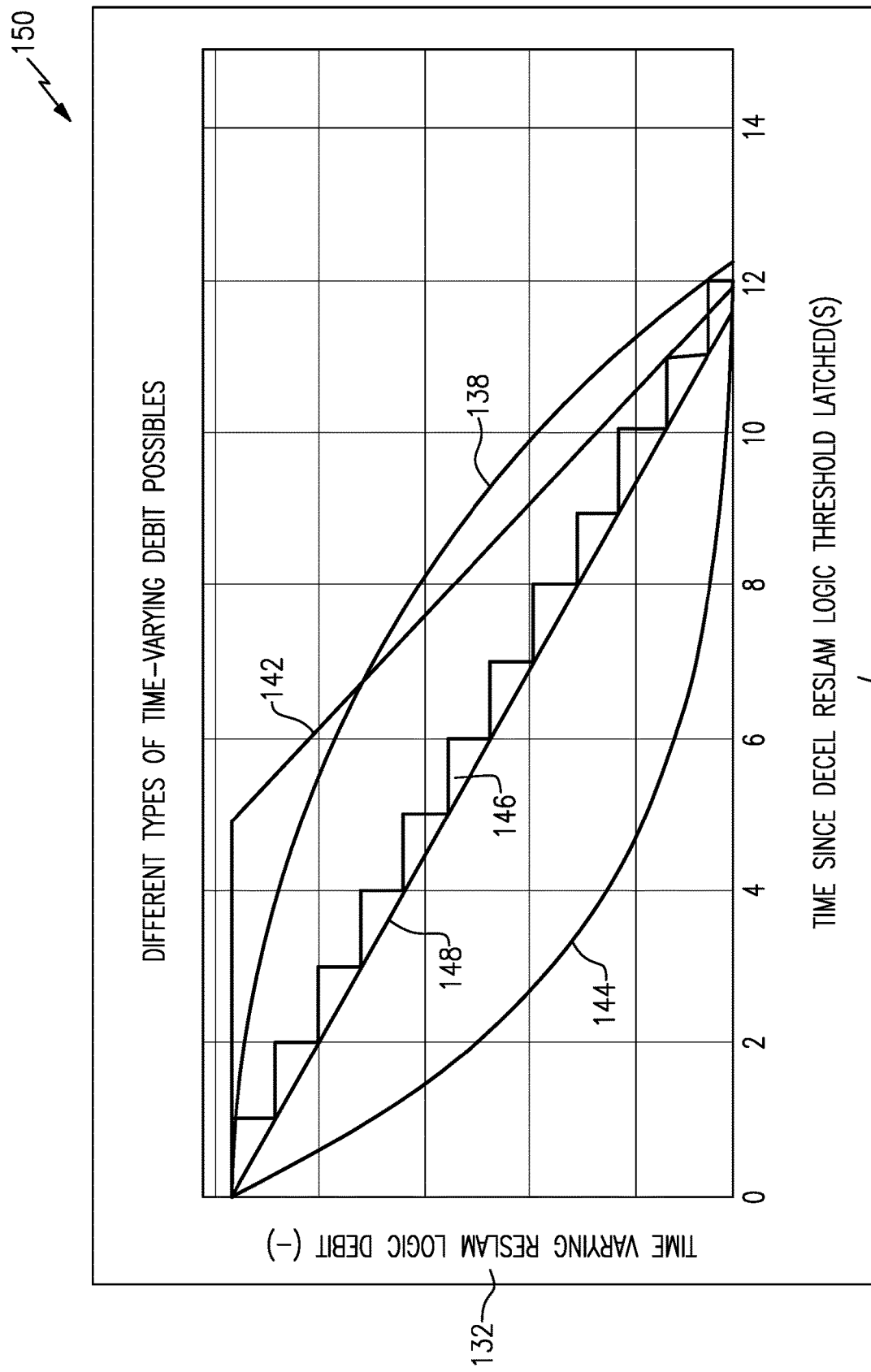
FIG. 9 is a graph illustrating additional example time varying reslam debit embodiments.

Referring to FIG. 9, graph 150 illustrates example varying reslam debits 132 over time 134. In one example, the reslam debit shown by line 142 remains constant for a first period and then decreases linearly until reaching zero as indicated at 152.

In another example, the reslam debit shown by line 144 decreases according to an exponential function. In another example, the reslam debit 146 decreases in a stepped fashion. In another example, the reslam debit decreases according to a constant slope as shown by line 148. In still another example, the reslam debit may decrease according to the line 138. Accordingly, the time-varying reslam debit 132 could be of any shape and magnitude. Moreover, each of the disclosed example rates may be further modified based on ambient conditions such as for example, altitude, temperature, aircraft speed and/or engine speed/power.

The example method debits the maximum fuel rate to enable maximizing acceleration while protecting against engine instability/exceedance at the beginning of the acceleration. Protecting the engine by using only the acceleration reference value may impact more of any the subsequent acceleration time than also using the maximum fuel flow rate.

A method of controlling an aircraft engine with an engine control system for limiting acceleration in response to reslam operation, the method according to an exemplary embodiment of this disclosure, among other possible things includes triggering a reslam logic 52, detecting an acceleration that exceeds an acceleration threshold 106, determining an elapsed time debit based on time elapsed from triggering of the reslam logic 52, the elapsed time debit is inversely proportional to the elapsed time 78 from triggering of the reslam logic 52, determining a debit 62 based at least partially on the elapsed time debit, setting an engine acceleration reference value limit and maximum fuel rate limit based on the debit 62, and operating the engine within the set acceleration value limit and the fuel rate limit.

In a further embodiment of the foregoing, the method further includes removing the debit 62 from the acceleration value limit and the fuel rate limit in response to an elapsed time 78 from the triggering of the reslam logic 52 that exceeds a predefined duration.

In a further embodiment of any of the foregoing, the method further includes returning limits to the acceleration reference value 64 and the fuel rate to non-debited limits at a predefined rate after the predefined duration.

In a further embodiment of any of the foregoing methods, the reslam logic 52 is triggered in response to a detected deceleration that exceeds a predefined threshold.

In a further embodiment of any of the foregoing, the method further includes quantifying a severity of the detected deceleration as a severity metric and determining the debit based on a combination of the elapsed time debit and the severity metric.

In a further embodiment of any of the foregoing methods, the severity metric is based on a maximum absolute ratio of the detected deceleration to a nominal deceleration reference value.

In a further embodiment of any of the foregoing methods, the elapsed time debit is further determined based in part on ambient conditions.

In a further embodiment of any of the foregoing, the method further includes determined the elapsed time debit as a constant for the predefined duration.

In a further embodiment of any of the foregoing, the method further includes determining the elapsed time debit separately for each of a plurality of time intervals beginning from the triggering of the reslam logic 52 to the predefined duration.

In a further embodiment of any of the foregoing, the detected deceleration is based on a measured core speed deceleration reaching a predefined threshold.

A control system for an aircraft engine according to another exemplary embodiment of this disclosure, among other possible things includes a controller 38 that includes a processor 46 and a memory 48 for setting acceleration limits of an engine during reslam operation, the controller 38 is programmed to trigger operation of a reslam logic 52, to detect an acceleration that exceeds an acceleration threshold, to determine an elapsed time debit based on time elapsed from triggering of the reslam logic 52, the elapsed time debit is inversely proportional to the elapsed time from triggering of the reslam logic 52, to determine a debit based at least partially on the elapsed time debit, setting an engine acceleration reference value limit and maximum fuel rate limit based on the debit, to operate the engine within the set acceleration value limit and the fuel rate limit, and to return limits to the acceleration reference value 64 and the fuel rate to a non-debited limit after the predefined duration.

In a further embodiment of the foregoing, the control system further includes returning limits to the acceleration reference value 64 and the fuel rate to non-debited limits at a predefined rate after the predefined duration.

In a further embodiment of any of the foregoing control systems, the reslam logic 52 is triggered in response to a detected deceleration that exceeds a predefined threshold.

In a further embodiment of any of the foregoing control systems, the controller 38 is further programmed to quantify a severity of the detected deceleration as a severity metric and to determine the debit based on a combination of the elapsed time debit and the severity metric.

In a further embodiment of any of the foregoing control systems, the controller 38 is further programmed to determine the elapsed time debit as a constant for the predefined duration.

In a further embodiment of any of the foregoing control systems, the controller 38 is further programmed to determine the elapsed time debit separately for each of a plurality of time intervals beginning from the triggering of the reslam logic 52 to the predefined duration.

An aircraft engine assembly according to another exemplary embodiment of this disclosure, among other possible things includes a core engine that includes a compressor section 24 where an inlet airflow is compressed, a combustor section 26 where the compressed inlet airflow is mixed with fuel and ignited to generate an exhaust gas flow that is communicated through a core flow path and a turbine section 28 where expansion of the exhaust gas flow is utilized to generate a mechanical power output. An engine control system includes a controller 38 that has a processor 46 and a memory 48 that includes instruction that is executed by the processor 46 for setting acceleration limits of the core engine during reslam operation. The controller 38 is programmed to trigger operation of a reslam logic threshold 52, to detect an acceleration that exceeds an acceleration threshold, to determine an elapsed time debit based on time elapsed from triggering of the reslam logic 52, the elapsed time debit is inversely proportional to the elapsed time from triggering of the reslam logic 52, to determine a constant debit based at least partially on the elapsed time debit, setting an engine acceleration reference value limit and maximum fuel rate limit based on the constant debit, to operate the engine within the set acceleration value limit and the fuel rate limit, and to return limits to the acceleration reference value 64 and the fuel rate to a non-debited limit after the predefined duration.

In a further embodiment of the foregoing, the controller 38 is further programmed to quantify a severity of a detected deceleration as a severity metric and to determine the constant debit based on a combination of the elapsed time debit and the severity metric.

In a further embodiment of any of the foregoing aircraft engine assemblies, the controller 38 is further programmed to determine the elapsed time debit as a constant for the predefined duration.

In a further embodiment of any of the foregoing aircraft engine assemblies, the controller 38 is further programmed to determine the elapsed time debit separately for each of a plurality of time intervals beginning from the triggering of the reslam logic 52 to the predefined duration.

A disclosed example embodiment of the reslam logic is implemented as part of an electronic engine controller (EEC) and is therefore enables simpler incorporation as compared to complex reslam logics where the debit is varying based on measured thermal recovery. The disclosed example reslam logic doesn't require measurements indicative of a thermal state of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of controlling an aircraft engine with an engine control system for limiting acceleration in response to reslam operation, the method comprising:

triggering a reslam logic in response to a detected deceleration that exceeds a predefined threshold;

detecting an acceleration exceeding an acceleration threshold;
determining an elapsed time debit based on time elapsed from triggering of the reslam logic, wherein the elapsed time debit is inversely proportional to the elapsed time from triggering of the reslam logic;
determining a debit based at least partially on the elapsed time debit;
setting an engine acceleration reference value limit and a maximum fuel rate limit based on the debit;
operating the engine within the set engine acceleration reference value limit and the maximum fuel rate limit; and
removing the debit from the engine acceleration reference value limit and the maximum fuel rate limit in response to the elapsed time from the triggering of the reslam logic exceeding a predefined duration, wherein the elapsed time debit is constant for the predefined duration.

2. The method as recited in claim 1, further comprising returning the engine acceleration reference value limit and the maximum fuel rate limit to a non-debited engine acceleration reference value limit and a non-debited maximum fuel rate limit after the predefined duration.

3. The method as recited in claim 1, further comprising quantifying a severity of the detected deceleration as a severity metric and determining the debit based on a combination of the elapsed time debit and the severity metric.

4. The method as recited in claim 3, wherein the severity metric is based on a maximum absolute ratio of the detected deceleration to a nominal deceleration reference value.

5. The method as recited in claim 1, wherein the elapsed time debit is further determined based in part on ambient conditions.

6. The method as recited in claim 1, further comprising determining the elapsed time debit separately for each of a plurality of time intervals beginning from the triggering of the reslam logic to the predefined duration.

7. The method as recited in claim 1, wherein the detected deceleration is based on a measured core speed deceleration reaching the predefined threshold.

8. A control system for an aircraft engine comprising:
a controller including a processor and a memory for setting acceleration limits of an engine during reslam operation, wherein the controller is programmed:
to trigger operation of a reslam logic;
to detect an acceleration exceeding an acceleration threshold;
to determine an elapsed time debit based on time elapsed from triggering of the reslam logic, wherein the elapsed time debit is inversely proportional to the elapsed time from triggering of the reslam logic;
to determine a debit based at least partially on the elapsed time debit;
setting an engine acceleration reference value limit and a maximum fuel rate limit based on the debit;
to operate the engine within the engine acceleration reference value limit and the maximum fuel rate limit;
to return the engine acceleration reference value limit and the maximum fuel rate limit to a non-debited engine acceleration reference value limit and a non-debited maximum fuel rate limit after a predefined duration; and
to determine the elapsed time debit as a constant for the predefined duration.

9. The control system as recited in claim 8, wherein the reslam logic is triggered in response to a detected deceleration that exceeds a predefined threshold.

10. The control system as recited in claim 9, wherein the controller is further programmed to quantify a severity of the detected deceleration as a severity metric and to determine the debit based on a combination of the elapsed time debit and the severity metric.

11. The control system as recited in claim 8, wherein the controller is further programmed to determine the elapsed time debit separately for each of a plurality of time intervals beginning from the triggering of the reslam logic to the predefined duration.

12. An aircraft engine assembly comprising:
a core engine including a compressor section where an inlet airflow is compressed, a combustor section where the compressed inlet airflow is mixed with fuel and ignited to generate an exhaust gas flow that is communicated through a core flow path and a turbine section where expansion of the exhaust gas flow is utilized to generate a mechanical power output; and
an engine control system including a controller having a processor and a memory including instructions executed by the processor for setting acceleration limits of the core engine during reslam operation, wherein the controller is programmed:
to trigger operation of a reslam logic;
to detect an acceleration exceeding an acceleration threshold;
to determine an elapsed time debit based on time elapsed from triggering of the reslam logic, wherein the elapsed time debit is inversely proportional to the elapsed time from triggering of the reslam logic;
to determine a constant debit based at least partially on the elapsed time debit;
setting an engine acceleration reference value limit and a maximum fuel rate limit based on the constant debit;
to operate the engine within the engine acceleration reference value limit and the maximum fuel rate limit; and
to return the engine acceleration reference value limit and the maximum fuel rate limit to a non-debited engine acceleration reference value limit and a non-debited maximum fuel rate limit after a predefined duration.

13. The aircraft engine assembly as recited in claim 12, wherein the controller is further programmed to quantify a severity of a detected deceleration as a severity metric and to determine the constant debit based on a combination of the elapsed time debit and the severity metric.

14. The aircraft engine assembly as recited in claim 12, wherein the controller is further programmed to determine the elapsed time debit as a constant for the predefined duration.

15. The aircraft engine assembly as recited in claim 12, wherein the controller is further programmed to determine the elapsed time debit separately for each of a plurality of time intervals beginning from the triggering of the reslam logic to the predefined duration.

\* \* \* \* \*